US007086241B2

(12) United States Patent
Holt (10) Patent No.: US 7,086,241 B2
(45) Date of Patent: Aug. 8, 2006

(54) HYDRAULIC POWER UNIT FOR A REFRIGERATION SYSTEM

(75) Inventor: Eugene Holt, Coos Bay, OR (US)

(73) Assignee: HydraCool, Inc., Eugene, OR (US)

( * ) Notice: Subject to any disclaimer, the term of this patent is extended or adjusted under 35 U.S.C. 154(b) by 0 days.

(21) Appl. No.: 10/857,190

(22) Filed: May 28, 2004

(65) Prior Publication Data

US 2004/0200230 A1 Oct. 14, 2004

(51) Int. Cl.
*F25B 27/00* (2006.01)

(52) U.S. Cl. .......................... 62/115; 62/323.1; 60/456
(58) Field of Classification Search .......... 62/239–244, 62/115, 323.1; 60/456; 236/34, 34.5
See application file for complete search history.

(56) References Cited

U.S. PATENT DOCUMENTS

| 3,913,831 | A | * | 10/1975 | Talak | 236/34.5 |
| 4,352,455 | A | * | 10/1982 | Moser et al. | 237/12.3 R |
| 4,352,456 | A | * | 10/1982 | Brandenburg, Jr. | 237/12.3 R |
| 4,371,112 | A | * | 2/1983 | Tholen | 237/12.3 A |
| 4,420,114 | A | * | 12/1983 | Moser et al. | 237/1 R |
| 4,432,493 | A | * | 2/1984 | Moser et al. | 237/12.3 R |
| 4,487,364 | A | * | 12/1984 | Okulicz et al. | 237/12.3 R |
| 5,085,269 | A | * | 2/1992 | Aoki | 165/43 |
| 5,333,679 | A | * | 8/1994 | Suzuki et al. | 165/43 |
| 5,355,939 | A | * | 10/1994 | Aoki | 165/202 |
| 6,308,665 | B1 | * | 10/2001 | Lewis | 123/41.12 |
| 6,662,586 | B1 | * | 12/2003 | Kooi | 62/243 |

* cited by examiner

*Primary Examiner*—William E. Tapolcai
(74) *Attorney, Agent, or Firm*—Birdwell & Janke, LLP (57) ABSTRACT

A hydraulic power unit for a refrigeration system. According to one aspect of the invention, the power unit is provided for driving the refrigeration system of a truck having an engine for propelling the truck and a power take off from the engine. The refrigeration system has a compressor for compressing a refrigerant and an evaporator which is cooled by the compressed refrigerant. The power unit comprises a pump, a compressor motor, and a hydraulic circuit. The pump is adapted for pumping hydraulic fluid and for connection to the power take off for driving the pump. The compressor motor is adapted for driving the compressor in response to receiving hydraulic fluid from the pump. The hydraulic circuit is adapted for conducting the hydraulic fluid from the pump to the compressor motor and for conducting the hydraulic fluid from the compressor motor back to the pump. The hydraulic circuit includes a temperature control portion for automatically diverting at least a portion of the fluid from the compressor motor in response to an indication of the temperature of the fluid.

19 Claims, 6 Drawing Sheets

Fig. 10

HYDRAULIC POWER UNIT FOR A REFRIGERATION SYSTEM

FIELD OF THE INVENTION

The present invention relates to a hydraulic power unit for a refrigeration system, particularly for use in a land transport vehicle such as a truck.

BACKGROUND

Refrigeration systems are commonly used in all types of transport vehicles for transporting perishable items, such as produce. As is typical in refrigeration and air conditioning systems, such systems include a compressor for compressing a refrigerant that is received by the compressor in a gaseous form and is compressed into a liquid form. This compression heats the refrigerant and the waste heat is convected away from the system by passing the refrigerant through a radiator (condenser) downstream of the compressor. The compressed refrigerant is then passed into an evaporator where it is allowed to expand into the gaseous form. This expansion cools the fluid which draws heat from the environment to produce the desired cooling. The gaseous refrigerant is then returned to the compressor. The amount of cooling is controlled by controlling the speed of the compressor. The refrigeration system attempts to provide and maintain a desired temperature in a "box" or storage volume of the vehicle, which is typically a semi-trailer pulled by a truck but may also be a railroad car pulled by a train engine.

Power for turning the compressor has typically been provided by a dedicated internal combustion engine having its own dedicated fuel supply. The cooling output is controlled by controlling the output of the engine. While providing a straight-forward means for regulating cooling, the dedicated engine has the disadvantage that it adds cost to the refrigeration system and is typically not as efficient as the engine used to power the vehicle itself. It is also a drawback of such prior art systems that maintaining two separate fuel supplies is inconvenient.

Alternatively, in the typical air conditioning system used in passenger vehicles, power for the system is obtained from the vehicle engine. The power is typically taken from the engine by belts and pullies and transmitted directly to the compressor. However, the power provided to the compressor varies with engine speed, which in turn varies with vehicle speed, so the amount of cooling cannot be controlled independently of the desired operation of the vehicle. Heat from the vehicle's cooling system can be used to compensate for over-cooling, but this is energy inefficient. Moreover, there is no mechanism for increasing the cooling if the engine output is too low.

In the context of a marine vehicle refrigeration system, the present inventor solved the problems associated with both the prior art refrigeration and vehicle air conditioning systems by powering a refrigeration system from the engine used for propelling the vehicle through use of a hydraulic transmission system. The hydraulic transmission system included a pump that was coupled directly to the engine. The engine turned the pump which in turn pressurized hydraulic fluid in hydraulic fluid lines that carried the pressurized hydraulic fluid to the remote location of the refrigeration system. A hydraulic motor received the pressurized hydraulic fluid and was caused to turn as a consequence. The system has not been known to function outside of the marine environment, however. In particular, the system has not been known to function in a truck or other land transport vehicle.

It was a particular insight of the present inventor to employ a variable volume pressure compensated pump to pump the hydraulic fluid. It is a characteristic of such pumps that the pressure output of the pump can be optimized or controlled independent of engine speed. As far as is known, the inventor's recognition of the advantage of this type of pump for the purpose of powering a refrigeration system was and continues to be unique.

Refrigeration systems also typically employ a blower for blowing air through the evaporator, to increase the efficiency of conducting heat from the environment to the expanding refrigerant at the evaporator and also for distributing the cooled air throughout the box. Typically, such blowers are directly connected to the compressor, although older units employed electrical power. When connected to the compressor, the blower speed changes with compressor speed, while electrically powered blowers were typically operated at a fixed speed.

Precise temperature control of the entire interior of the box can be critical. For example, while it is necessary to maintain as low a temperature as possible for highly perishable items, it may be critical that the items not be permitted to freeze. It has been found that prior art refrigeration systems for truck use have not been entirely satisfactory in this regard.

Accordingly, there is a need for a hydraulic power unit for a refrigeration system that provides for improved cooling control without the need for a dedicated engine, particularly for use in trucks or other land transport vehicles.

SUMMARY

The present invention provides for a hydraulic power unit for a refrigeration system. According to one aspect of the invention, the power unit is provided for driving the refrigeration system of a truck having an engine for propelling the truck and a power take off from the engine. The refrigeration system has a compressor for compressing a refrigerant and an evaporator which is cooled by the compressed refrigerant. The power unit comprises a pump, a compressor motor, and a hydraulic circuit. The pump is adapted for pumping hydraulic fluid and for connection to the power take off for driving the pump. The compressor motor is adapted for driving the compressor in response to receiving hydraulic fluid from the pump. The hydraulic circuit is adapted for conducting the hydraulic fluid from the pump to the compressor motor and for conducting the hydraulic fluid from the compressor motor back to the pump. The hydraulic circuit includes a temperature control portion having a heat exchanger and adapted for diverting at least a portion of the hydraulic fluid through the heat exchanger in response to a temperature indication indicating the temperature of the fluid.

According to another aspect of the invention, the refrigeration system further includes a blower for blowing air through the evaporator. The power unit comprises a pump, a blower motor, and a hydraulic circuit. The pump is adapted for pumping hydraulic fluid and for connection to the power take off for driving the pump. The blower motor is adapted for driving the blower in response to receiving hydraulic fluid from the pump. The hydraulic circuit is adapted for conducting the hydraulic fluid from the pump to the blower motor and for conducting the hydraulic fluid from the blower motor back to the pump. The hydraulic circuit includes a temperature control portion having a heat exchanger and adapted for diverting at least a portion of the hydraulic fluid through the heat exchanger in response to a temperature indication indicating the temperature of the fluid.

It is to be understood that this summary is provided as a means of generally determining what follows in the drawings and detailed description of preferred embodiments and is not intended to limit the scope of the invention. Moreover, the objects, features and advantages of the invention will be more readily understood upon consideration of the following detailed description taken in conjunction with the accompanying drawings.

DESCRIPTION OF PREFERRED EMBODIMENTS

Figure 1:
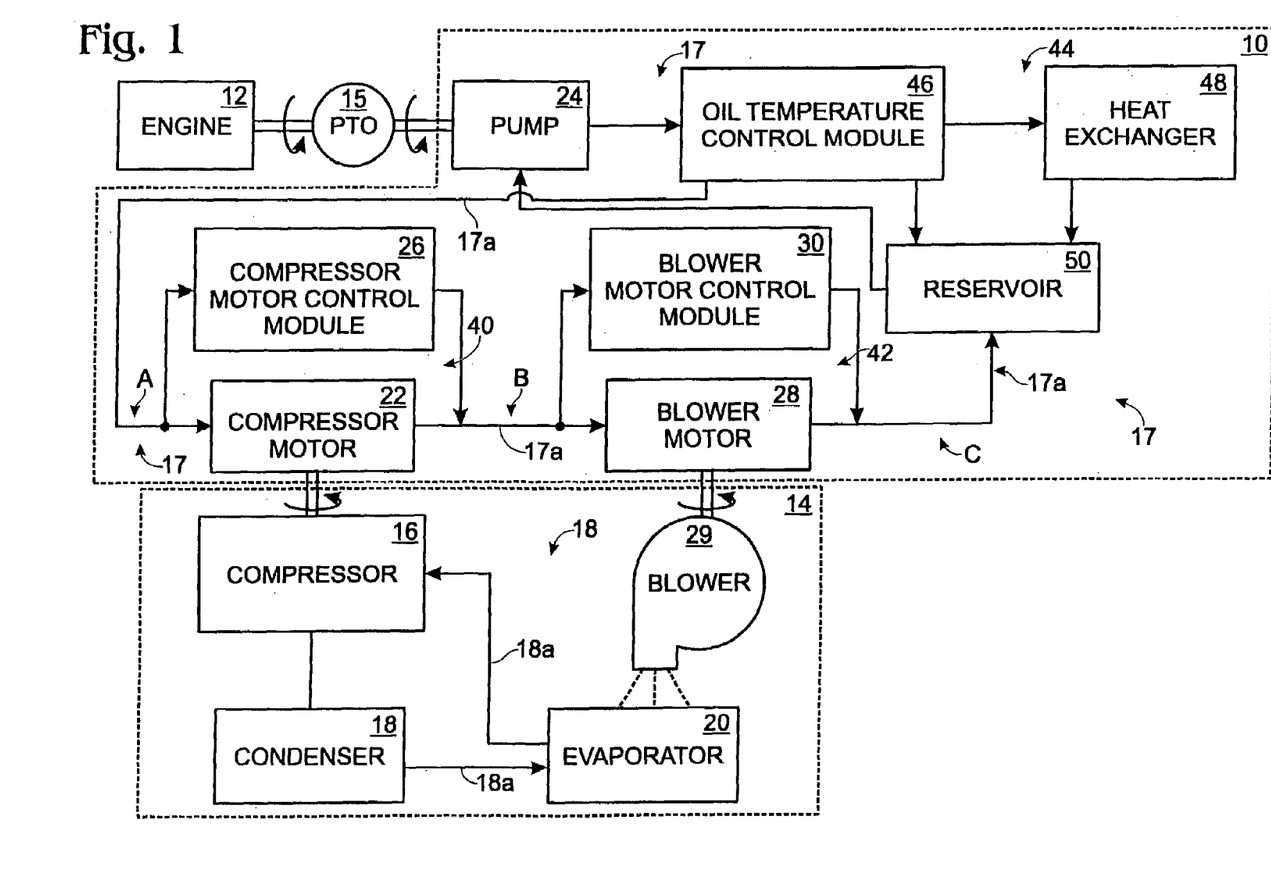
FIG. 1 is a schematic diagram of a hydraulic power unit for a refrigeration system according to the present invention.

FIG. 1 is a schematic view of a hydraulic power unit 10 for transmitting power from an engine 12 to a refrigeration system 14. The present inventor had recognized the desirability of providing a hydraulic power unit for a refrigeration system that is particularly adapted for use in a truck and attempted to adapt the marine system described above for that purpose. However, he discovered through these attempts that the hydraulic fluid would boil under certain conditions, so that the system was not functional. The present invention solves this problem.

Figure 2:
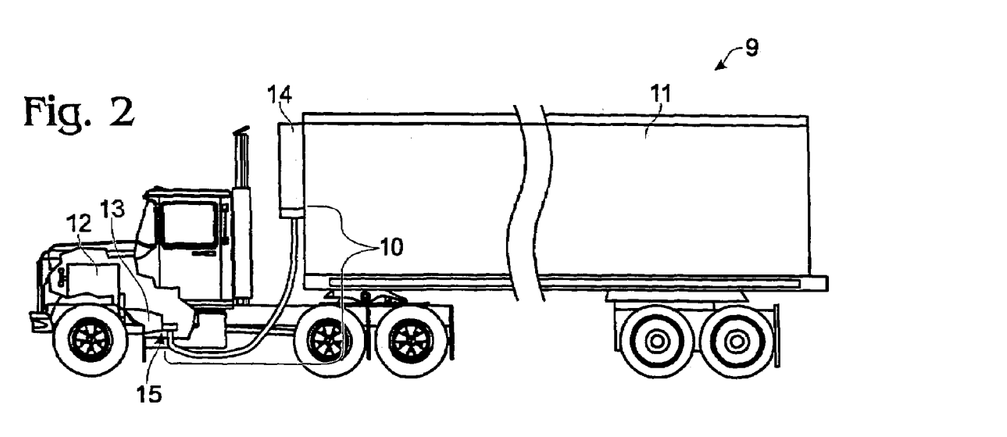
FIG. 2 is a pictorial, partially cut-away view of a preferred land transport vehicle for use with the present invention.

Accordingly and with reference to FIG. 2, the engine, hydraulic power unit, and refrigeration system are all contained on a land transport vehicle 9, particularly in the preferred embodiment of the invention a truck adapted for heavy or large cargo transport, such as a standard semitrailer truck. The truck has a cargo volume 11 which is referred to herein as a "box."

The engine 12 is used for propelling the truck and is typically a large internal combustion engine, most typically a diesel engine. The engine provides a torque output over a range of engine speeds and is coupled to the driving wheels of the truck through a transmission 13. The torque output of the engine is made available for powering auxiliary devices through a power take off ("PTO") 15. As will be readily appreciated by persons of ordinary mechanical skill, the PTO 15 may be coupled directly to the engine, transmission, rear end, or other component of the truck's power train, or the PTO may be coupled to an auxiliary device that is in turn coupled to the engine. The invention provides the outstanding advantage, however, that the engine 12 is used as the ultimate source of power provided to the refrigeration system 14.

Turning back to FIG. 1, the hydraulic power unit 10 includes a hydraulic pump 24 that is coupled to the power output of the engine through the PTO 15. The hydraulic pump is adapted to pump hydraulic fluid, typically (and hereinafter) oil, through a hydraulic circuit 17 under pressure. The hydraulic pump 24 may be any standard type of pump used in hydraulic systems such as earthmoving equipment. However, preferably, the pump 24 is of the type known in the art of hydraulic systems as variable volume pressure compensated ("VVPC"). The VVPC type of pump 24 compensates for both load and engine speed so as to provide a substantially constant pumping pressure.

As is typical, the refrigeration system 14 includes a compressor 16, a condenser 18, and an evaporator 20 having the usual functions. A refrigerant flows through a refrigerant circuit 18 through refrigerant carrying lines 18a. The hydraulic power unit 10 drives the compressor; more particularly, the hydraulic power unit 10 includes a hydraulic compressor motor 22 for this purpose.

The hydraulic circuit 17 includes hydraulic oil carrying lines 17a that carry and route the hydraulic oil that is pressurized by the pump 24. The hydraulic circuit routes the pressurized hydraulic oil to the compressor motor 22 as well as to a compressor motor control module 26 for controlling the amount of the hydraulic oil that is provided to the compressor motor.

The compressor motor 22 and the control module 26 are coupled in parallel. Particularly, both the compressor motor 22 and the control module 26 receive hydraulic oil from the circuit 17 at "A," and both the compressor motor and the control module 26 output hydraulic oil at "B." The control module 26 controls the amount of oil provided to the compressor motor 22 by accepting (shunting) more or less of the oil through the control module. In a preferred embodiment of the invention, the control module 26 provides for just two operating modes of control of the compressor motor, "high cool" and "low cool."

Figure 3:
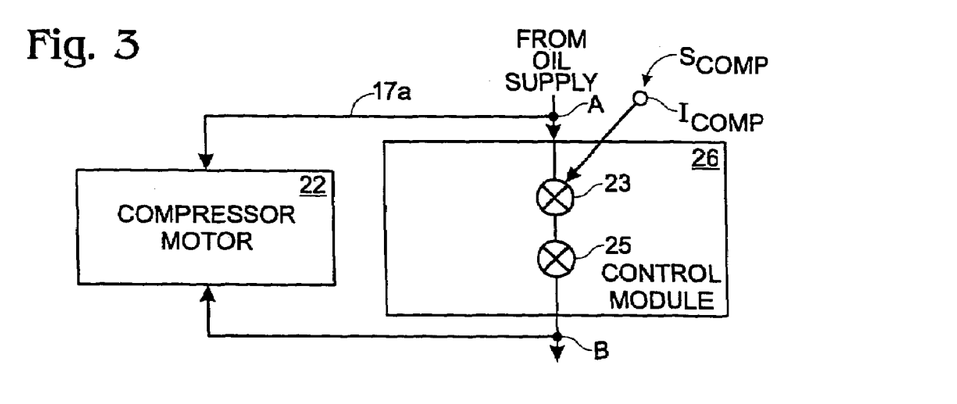
FIG. 3 is a schematic diagram of a compressor motor control module according to the present invention.

Turning to FIG. 3, the control module 26 includes a signal input "$I_{COMP}$" for receiving a signal "$S_{COMP}$" indicating either "high cool" or "low cool" modes of operation. The signal "$S_{COMP}$" may be generated electrically, mechanically, hydraulically, or pneumatically and is selected by a user of the system such as by use of a toggle or rotary switch.

A binary state, flow control valve 23 of the control module 26 is either "open" or "closed." When the signal indicates "high cool" mode, the valve 23 is closed so that substantially no hydraulic oil is shunted away from the compressor motor 22; substantially all of the hydraulic oil flowing in the line 17a passes through the compressor motor. When the signal indicates "low cool" mode, the valve 23 is opened so that a set amount of the hydraulic oil is shunted away from the compressor motor 22. Preferably, a flow-set valve 25 is used to set the proportion of the oil that is accepted through the control module 26 rather than being provided to the compressor motor 22. The valve 25 may provide for a fixed or adjustable flow rate, and if the latter may easily be manually pre-set to determine the flow in low cool mode. The valve 25 may also provide for additional cooling modes, and may provide for a continuous range of adjustment, and therefore a continuous range of cooling output, either manually or automatically, remotely or locally.

As an example of setting the valve 25 for two cooling modes, the compressor motor 22 may turn 1800 rpm in high cool mode and only 1400 rpm in low cool mode. Where, for example, 10.5 gallons are required to turn the motor 1800 revolutions, to a first approximation about 1400/1800 gallons (0.78) would be required to turn the motor 1400 revolutions. Thence, (1−0.78)×10.5 gallons (2.3 gallons) would be shunted through the valve 23, or about 22% of the total flow. The actual amount of flow set by the valve 25 is best determined empirically.

Preferably, the hydraulic power unit 10 also includes a fan or blower for blowing air through the evaporator 20 and thereby increasing the efficiency of heat transfer between the air and the evaporator as well as distributing the cooled air throughout the box 11 (FIG. 2). More particularly, referring back to FIG. 1, the hydraulic power unit 10 includes a hydraulic blower motor 28 for mechanically driving a blower 29. The hydraulic circuit 17 routes the pressurized hydraulic oil to the blower motor 28 as well as to a blower motor control module 30 for controlling the amount of the hydraulic oil that is provided to the blower motor.

As for the compressor motor and its associated control module, the blower motor 28 and the blower control module 30 are coupled in parallel. Particularly, both the blower motor 28 and the blower control module 30 receive hydraulic oil from the circuit 17 at "B," and both the blower motor and the blower control module output hydraulic oil at "C." The blower control module 30 controls the amount of oil provided to the blower motor 28 by accepting more or less of the oil through the control module.

It is recognized herein that it is desirable to maintain the speed of the blower motor 28 to be substantially constant, or at least independent of the speed of the engine 12 or the load of the hydraulic circuit 17. It is further recognized that it is desirable to employ a VVPC type pump 24 to accomplish this purpose.

Figure 4:
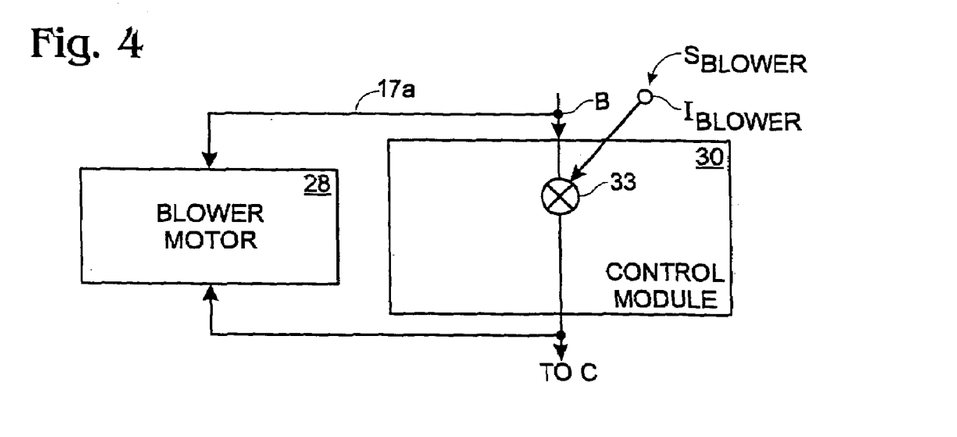
FIG. 4 is a schematic diagram of a blower motor control module according to the present invention for use with a pump having a substantially constant power output.

Turning to FIG. 4, a detail of the blower control module 30 is shown configured for the simple case where the VVPC pump 24 is used. In that case, the blower control module 30 may simply provide for a "blower on" and a "blower off" mode of operation, the blower motor speed being governed by the pump 24. The blower control module 30 includes a signal input "$I_{BLOWER}$" for receiving a signal "$S_{BLOWER}$" indicating either "blower on" or "blower off" modes of operation. The signal "$S_{BLOWER}$" may be generated electrically, mechanically, hydraulically, or pneumatically and is selected by a user of the system.

A binary state, flow control valve 33 of the control module 30 is either "open" or "closed." When the signal indicates "blower on" mode, the valve 33 is closed so that substantially no hydraulic oil is shunted away from the blower motor 28; substantially all of the hydraulic oil flowing in the line 17a passes through the blower motor. When the signal indicates "blower off" mode, the valve 33 is opened so that substantially all the hydraulic oil is shunted away from the blower motor 22.

Similar to the compressor control module 26, the blower control module 30 may be modified to provide for two blower speeds, or additional blower speeds, and may provide for a continuous range of adjustment of blower speed, and therefore a continuous range of blower output, either manually or automatically, remotely or locally.

Figure 5:
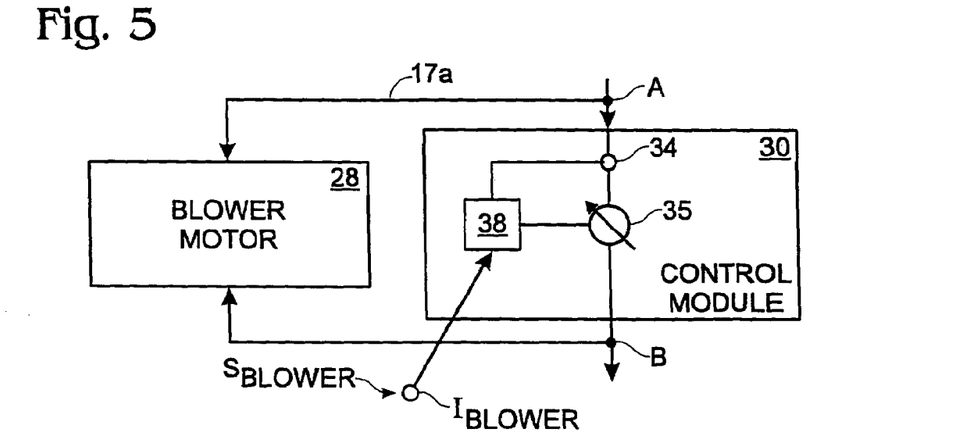
FIG. 5 is a schematic diagram of a blower motor control module according to the present invention with compensation for use with a pump subject to varying power output.

Turning to FIG. 5, where the output of the pump 24 is variable, the blower control module may include a variable flow-set valve 35 that is automatically controlled to compensate for variations in the pressure of the hydraulic fluid. Since the power provided to the blower motor is defined by the rate of flow of the oil to the blower motor multiplied by the pressure of the oil at the blower motor, the control module 30 may provide a transducer 36 for measuring the oil pressure and a compensating controller 38 for receiving the output of the transducer 36 and automatically adjusting the flow rate of the valve to compensate for changes in the pressure. The desired speed of the blower may be provided as a set-point with the signal "$S_{BLOWER}$." Changes in pressure may also be deduced, for example, by monitoring the speed of the engine 12. The compressor control module 26 can be similarly adapted to compensate for variable pump output.

Turning back to FIG. 1, the compressor motor 22 and the compressor motor control module 26 may be considered to define a compressor portion 40 (shown in FIG. 1 between "A" and "B") of the hydraulic circuit 17, where the blower motor 28 and the blower motor control module 30 define a blower portion 42 (shown in FIG. 1 between "B" and "C") of the hydraulic circuit. While the compressor and blower portions of the circuit 17 are shown in series in FIG. 1, it should be understood that they may be provided in parallel with no loss of generality.

Regardless, the two circuit portions are together coupled in series with a temperature control portion 44 of the circuit 17. The temperature control portion 44 provides for controlling the temperature of the oil to protect the compressor and blower motors and to ensure that these components operate at peak efficiency.

Figure 6:
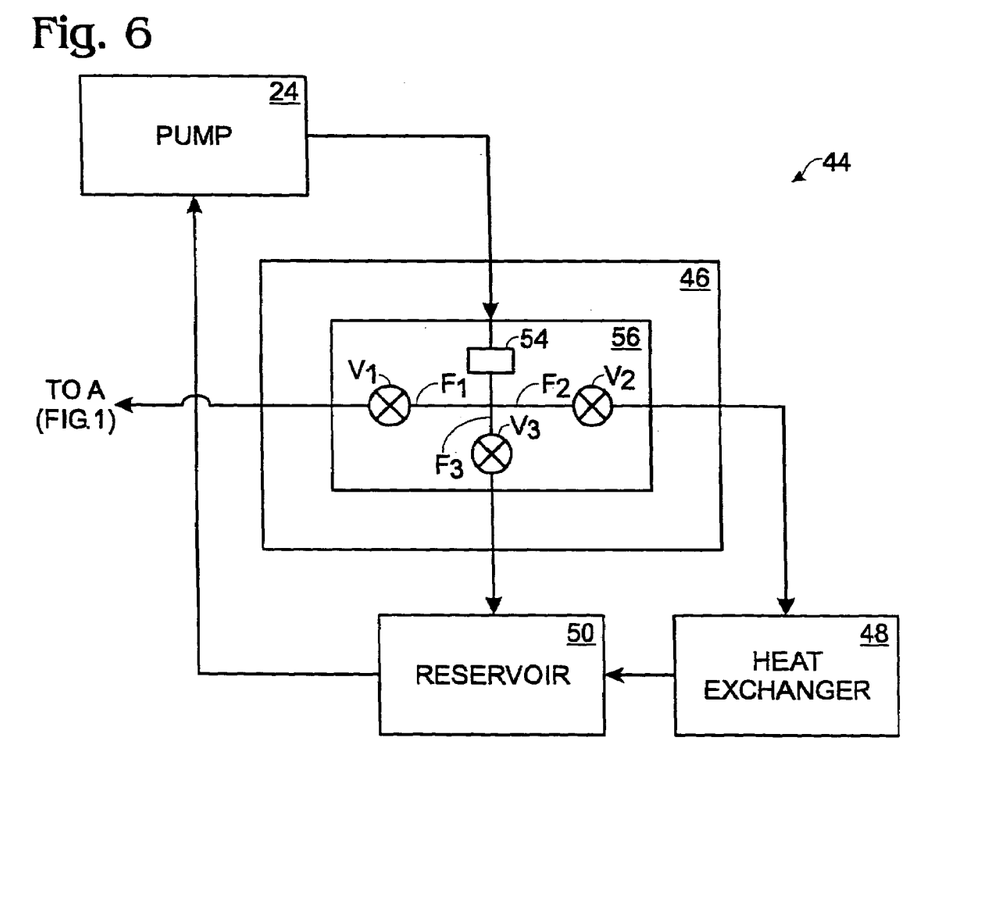
FIG. 6 is a schematic diagram of a generalized oil temperature control module according to the present invention.

Referring to FIG. 6, the temperature control portion 44 of the hydraulic circuit 17 includes an oil temperature control module 46, a heat exchanger 48 and an oil reservoir 50. A hydraulic line 17a₁ (FIG. 1) routes the hydraulic oil from the blower portion 42 of the hydraulic circuit 17 to the oil reservoir 50.

The heat exchanger is provided for cooling oil that is too hot, however the heat exchanger could be used for heating oil that is too cold, and two heat exchangers could be used to both cool oil that is too hot and heat oil that is too cold with slight modification to the temperature control module 46 as will be readily apparent to persons of ordinary skill. The heat exchanger can exchange heat with the air cooled by the refrigeration system 14 or may be cooled by air, water, oil or other fluid provided from an external source.

The oil is preferably always passed through the reservoir 50, however this is not essential to the invention. The reservoir 50 provides room for the oil to expand as it is heated, and it provides for the removal of bubbles in the oil.

The control module 46 receives oil from the pump 24 and senses the oil temperature, or receives an indication thereof from another source, the sensing being indicated generally at 54. The temperature control module 46 provides a controller 56 including three valves $V_1$, $V_2$, and $V_3$ that together define three different flow configurations, or patterns of oil flow $F_1$, $F_2$, and $F_3$, depending on the sensed temperature of the oil. If the oil is too cold, i.e., less than a predetermined minimum $T_L$ (not shown), the controller defines a warm-up flow configuration whereby the valve $V_1$ is closed to prevent the oil from reaching the point "A" in FIG. 1 and thereby to prevent the oil from reaching the compressor or blower motors. The valve $V_2$ is also closed to prevent flow to the heat exchanger. The valve $V_3$ is open to recirculate the oil to the pump 24, in this case by passing it through the reservoir 50 which in turn returns the oil to the pump.

When the oil reaches a desired operating temperature, i.e., the temperature exceeds $T_L$, an operating flow configuration is defined whereby the valve $V_1$ is opened to permit oil to flow to the compressor and blower portions 40 and 42 of the hydraulic circuit 17 through point A (FIG. 1). The valve $V_3$ is closed to cease recirculating oil to the pump and the valve $V_2$ leading to the heat exchanger remains closed.

When the oil is about to become too hot, i.e., the temperature reaches a pre-set higher temperature limit $T_H$ (not shown), an over-temperature flow configuration is defined whereby the valve $V_2$ is opened to permit oil to flow through the heat exchanger 48, to cool the oil. If the oil becomes dangerously hot, the valve "$V_1$" permitting flow to the compressor and blower portions 40 and 42 of the circuit 17 may also be closed.

The valves "V" may be solenoid controlled in response to electrical signals issued by an electrical controller 56, where the electrical controller receives an electrical signal from a sensor 54 having an electrical signal output for indicating the temperature. However, in the preferred embodiment of the invention, the controller 56 and the valves V are provided in the form of "three-way thermostatic control valves" that provide the advantage of automatic control without the need for any electrical or other source of power. Such valves are commercially available, e.g., from Fluid Power Energy, Inc. of Waukesha, Wis.

Three-way thermostatic control valves (hereinafter "diverter valves") employ a semi-liquid wax that undergoes large expansion within a relatively narrow temperature range. The expansion of the wax provides for movement of a slider sleeve which provides positive three-way valve action. The valves are factory set at predetermined temperatures. A single diverter valve provides for a "straight-through" fluid flow path and a "bypass" fluid flow path. If the fluid temperature is below a threshold, the valve fully closes the bypass fluid flow path and the straight-through path is fully open. When the temperature reaches the threshold, the valve partially opens the bypass path and partially closes the straight-through path. As the temperature continues to rise, the valve more completely opens the bypass path and more completely closes the straight-through path until the bypass path is fully open and the straight-through path is fully closed.

Figure 7:
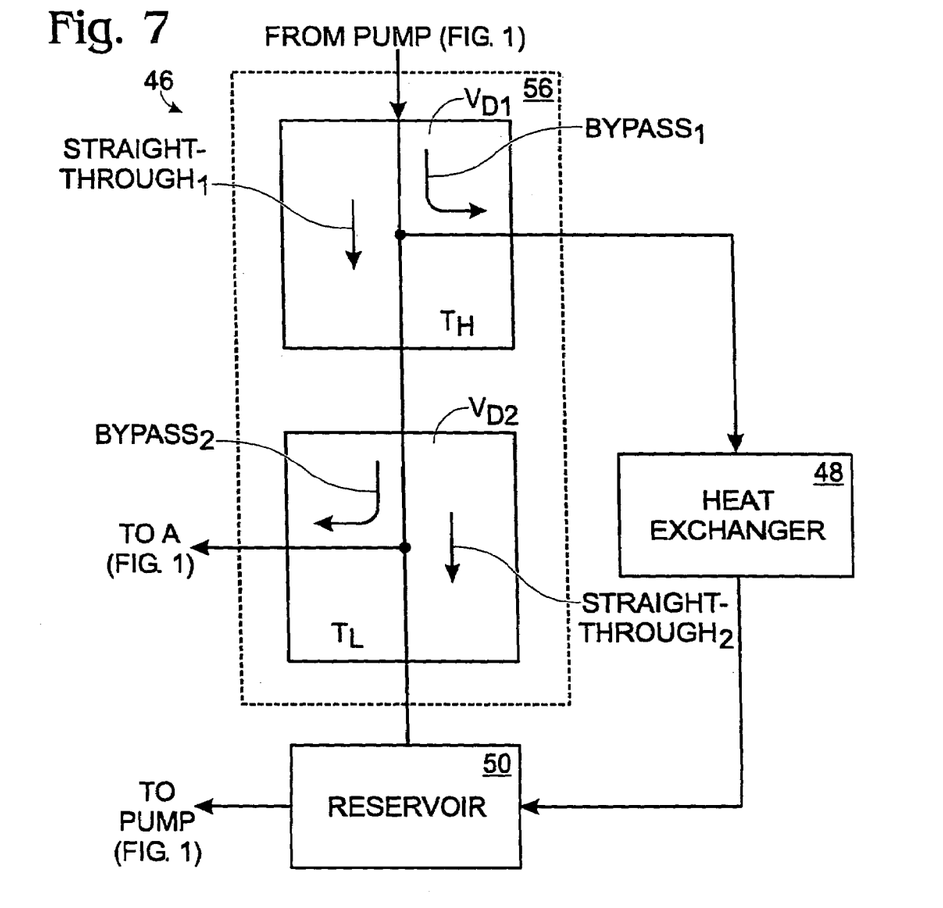
FIG. 7 is a schematic diagram of the oil temperature control module of FIG. 6 implemented with two thermostatic valves.

In the simplest embodiment of the temperature control portion 44 of the hydraulic circuit 17 as described above, the valve $V_1$ is closed when the oil temperature is below $T_L$, the valve $V_2$ is closed when the oil temperature is below $T_H$, and the valve $V_3$ is closed when then the temperature is above $T_L$. Two diverter valves $V_{D1}$ and $V_{D2}$ may be employed to be responsive to the two different temperatures as shown in FIG. 7.

The diverter valve $V_{D1}$ has a wax set-point temperature of $T_H$ and defines a straight-through fluid flow path "STRAIGHT-THROUGH$_1$," and a bypass fluid flow path "BYPASS$_1$." Similarly, the diverter valve $V_{D2}$ has a wax set-point temperature of $T_L$ and defines a straight-through fluid flow path "STRAIGHT-THROUGH$_2$" and a bypass fluid flow path "BYPASS$_2$." To the extent that the temperature at the valve $V_{D1}$ increases beyond its set-point $T_H$, more of the flow received from the pump 24 is diverted to the heat exchanger 48 through the path BYPASS$_1$ and less of the flow is transmitted straight through to the valve $V_{D2}$ through the path STRAIGHT-THROUGH$_1$. Conversely, to the extent that the temperature at the valve $V_{D2}$ exceeds its set-point $T_L$, less of the flow received from the valve $V_{D1}$ is diverted to the reservoir 50 through the path STRAIGHT-THROUGH$_2$ and more of the flow is transmitted through the path BYPASS$_3$ to the compressor and blower circuit portions 40 and 42 through the point A (FIG. 1).

Figure 8:
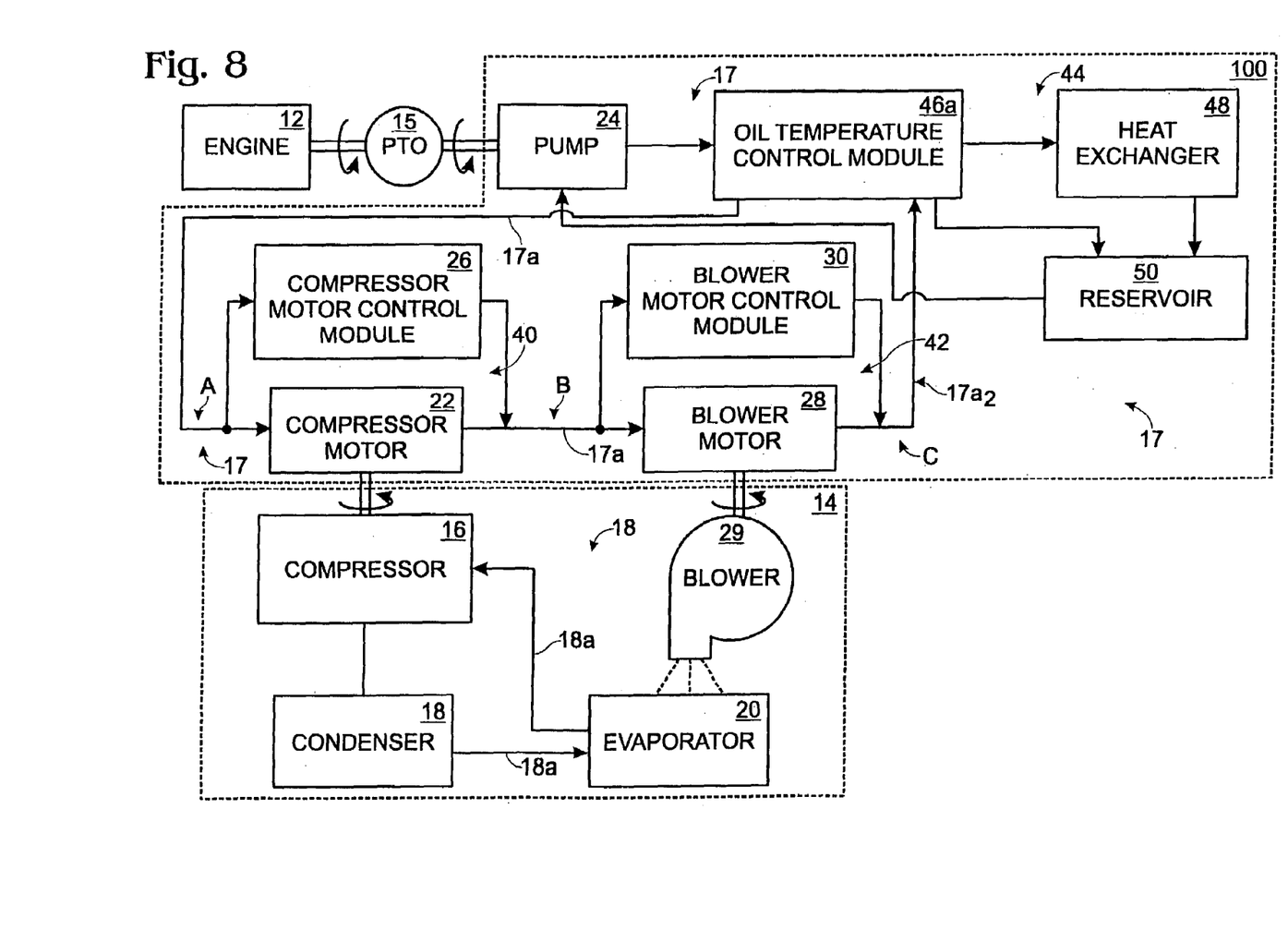
FIG. 8 is a schematic diagram of a preferred hydraulic power unit according to the present invention.

FIG. 8 shows a preferred hydraulic power unit 100 for the refrigeration system 14 of FIG. 1. The power unit 100 is substantially the same as the power unit 10 of FIG. 1 (and therefore retains the same reference designators) except that a hydraulic line $17a_2$ routes the hydraulic oil from the blower portion 42 of the hydraulic circuit 17 to a temperature control module 46a rather than to the reservoir 50.

Figure 9:
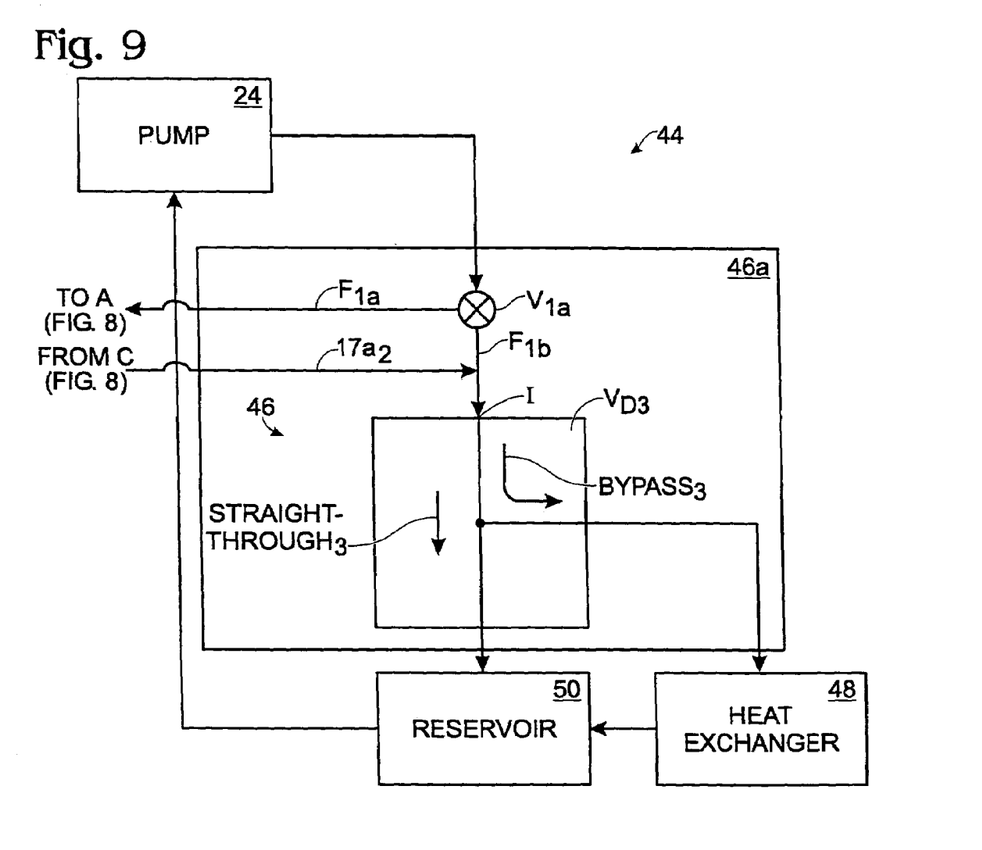
FIG. 9 is a schematic diagram of a preferred oil temperature control module according to the present invention.

FIG. 9 shows the oil temperature control module 46a of the preferred embodiment in more detail. The temperature control module 46a includes a valve $V_{1a}$ and a diverter valve $V_{D3}$. If the oil is determined to be at or above a desired operating temperature, the valve $V_{1a}$ routes the oil through a flow path $F_{1a}$ leading to the compressor and blower portions 40 and 42 of the hydraulic circuit 17 through point A (FIG. 8). At the same time and to the same extent, oil is prevented from flowing through the flow path $F_{1b}$ leading to the heat exchanger 48 and the reservoir 50. The valve may variably apportion the flow between the two paths but is preferably a binary state valve that provides for full flow through a selected one of the flow paths while completely preventing flow through the other of the flow paths. The valve is preferably simply operated by hand, but it may be adapted for electrical control for remote manual operation, or may be part of an automatic temperature control system that measures or otherwise responds to the oil temperature and adjusts the valve accordingly.

Where the valve $V_{1a}$ is set to route oil to either the heat exchanger 48 or the reservoir, the oil is caused to flow through the path $F_{1b}$ to a diverter valve $V_{D3}$. The diverter valve $V_{D3}$ has a wax set-point temperature of $T_H$ and defines a straight-through fluid flow path "STRAIGHT-THROUGH$_3$," and a bypass fluid flow path "BYPASS$_3$." To the extent that the temperature at the valve $V_{D3}$ increases beyond its set-point $T_H$, more of the flow received from the pump 24 is diverted to the heat exchanger 48 through the path BYPASS$_3$ and less of the flow is transmitted straight through to the reservoir 50 through the path STRAIGHT-THROUGH$_3$. Oil received from point C (FIG. 1) through the hydraulic line $17a_2$ is also provided to the input "I" of the diverter valve $V_{D3}$ for processing through the diverter valve.

Figure 10:
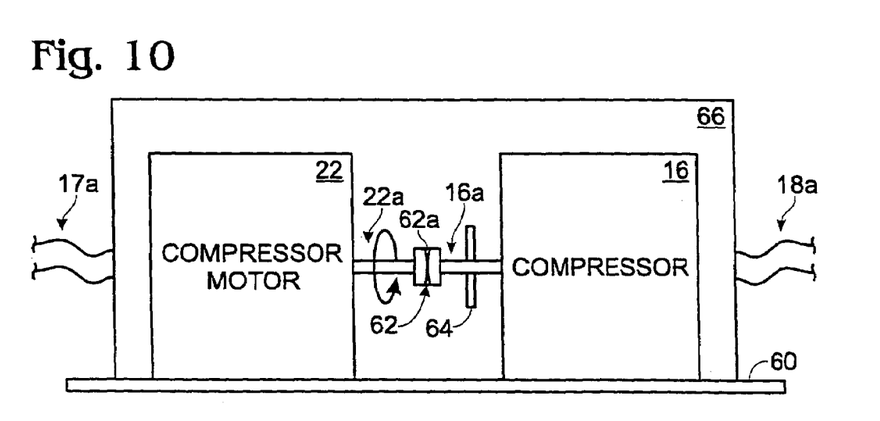
FIG. 10 is a schematic diagram of a means for coupling a hydraulic compressor motor to a compressor according to the present invention.

Turning to FIG. 10, the compressor motor 22 typically has a motor shaft 22a and the compressor 16 has a compressor shaft 16a. Typically, prior art compressors that are not coupled directly to an internal combustion engine include a pulley adapted to receive a belt for driving the shaft 16a. For example, an electric compressor motor would typically include a shaft having a first pulley and the compressor shaft 16a would include a second pulley. A belt couples the first pulley to the second pulley. The pulley has been provided for the purpose of adjusting the gearing ratio between the two shafts.

Alternatively, where the compressor 16 is coupled directly to an internal combustion engine, an axial coupler is typically used to coaxially couple the shaft of the internal combustion engine to the shaft 16a.

The present inventor has recognized that in the case of coupling directly to an internal combustion engine, the rotating mass of the internal combustion engine provides a flywheel effect that is important for smoothing vibrations emanating from the compressor, and that this function was provided by the pulley when a belt drive system was used.

It was further recognized that the hydraulic compressor motor 22 operates more like an internal combustion engine in terms of the variation in engine speeds that it can provide, so that employing a pulley system for changing gear ratios is unnecessary. Thence, according to the present invention, a coupler 62 is preferably employed that coaxially couples the shaft 22a to the shaft 16a, and a vibration dampener 64 is preferably added to the system to smooth the vibrations. The vibration dampener is preferably a metal disk or flywheel that is mounted to either the shaft 16a or the shaft 22a but may have other configurations. While a flywheel or other vibration dampener is not essential to the invention, the hydraulic motor 22 has a relatively low mass and the compressor 16 typically produces a high level of vibration, so that the vibration dampener is highly desirable in practice. The vibration dampener is also preferably dynamically balanced, and is further preferably dynamically balanced on the shaft with the power unit and refrigeration system in full operation.

The compressor motor 22 and the compressor 16 are preferably both mounted, e.g., by bolting or welding, to a rigid mount 60 so that alignment between the compressor motor shaft 22a and the compressor shaft 16a can be reliably maintained. To minimize the effect of any misalignment, the coupler 62 is preferably flexible, such as by having at least a joint portion 62a formed of rubber. Further, to provide for operator safety, an enclosure 66 is provided to prevent inadvertent access to rotating parts.

It is to be recognized that, while a hydraulic power unit for a refrigeration system has been shown and described as preferred, other configurations and methods could be utilized, in addition to those already mentioned, without departing from the principles of the invention. For example, the logic described above for providing the oil temperature control, compressor control, and blower control portions of the hydraulic circuit 17 could be implemented by various means, automatic, semi-automatic, or manual, distributed or integrated, in any combination of electrical, mechanical, hydraulic, and pneumatic elements and circuits, as will be readily appreciated by persons of ordinary skill.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A power unit for a refrigeration system for use in a land transport vehicle having an engine for propelling the land transport vehicle and a power take off from the engine, the refrigeration system having a compressor for compressing a refrigerant and an evaporator which is cooled by the compressed refrigerant, the power unit comprising:
   a pump adapted for pumping hydraulic fluid, automatically adjusting the pressure of said hydraulic fluid in substantial compensation for changes in engine speed, and connecting to the power take off for driving said pump;
   a hydraulic compressor motor for driving the compressor in response to receiving hydraulic fluid from said pump; and
   a hydraulic circuit for conducting said hydraulic fluid from said pump to said compressor motor and for conducting said hydraulic fluid from said compressor motor back to said pump, said hydraulic circuit including a temperature control portion having a heat exchanger and adapted for diverting at least a portion of said hydraulic fluid through said heat exchanger in response to a temperature indication indicating the temperature of said fluid, in such manner as to provide for at least one of (a) reducing the temperature of said fluid where the temperature is too high, and (b) increasing the temperature of said fluid where the temperature is too low.

2. The power unit of claim 1, wherein said temperature control portion is adapted for diverting at least a portion of said fluid from said compressor motor in response to said temperature indication.

3. The power unit of claim 2, wherein said temperature control portion is adapted for recirculating at least a portion of said hydraulic fluid through said pump in response to said temperature indication.

4. The power unit of claim 1, wherein said temperature control portion includes a valve responsive to said temperature indication and providing a first flow configuration in which substantially all of said fluid is recirculated through said pump, a second flow configuration in which substantially all of said fluid is passed through said heat exchanger and said compressor motor, and a third flow configuration in which substantially all of said fluid is passed through said compressor motor without being passed through said heat exchanger.

5. The power unit of claim 1, wherein said hydraulic circuit includes a compressor motor control portion adapted to shunt a controlled amount of said fluid from said compressor motor in response to a mode indication indicating the mode of operation of said compressor motor.

6. A power unit for a refrigeration system for use in a truck having an engine for propelling the truck and a power take off from the engine, the refrigeration system having a compressor for compressing a refrigerant and an evaporator which is cooled by the compressed refrigerant, the power unit comprising:
   a pump adapted for pumping hydraulic fluid and connecting to the power take off for driving said pump:
   a hydraulic compressor motor for driving the compressor in response to receiving hydraulic fluid from said pump; and
   a hydraulic circuit for conducting said hydraulic fluid from said pump to said compressor motor and for conducting said hydraulic fluid from said compressor motor back to said pump, said hydraulic circuit including a temperature control portion having a heat exchanger and adapted for diverting at least a portion of said hydraulic fluid through said heat exchanger in response to a temperature indication indicating the temperature of said fluid, in such manner as to provide for at least one of (a) reducing the temperature of said fluid where the temperature is too high, and (b) increasing the temperature of said fluid where the temperature is too low, wherein said hydraulic circuit includes a compressor motor control portion adapted to shunt a controlled amount of said fluid from said compressor motor in response to a mode indication indicating the mode of operation of said compressor motor, wherein said mode indication has at least two values and wherein said compressor motor control portion includes a control valve providing for at least two different flow rates in series with a flow-set valve providing for a single flow rate, said control valve being adapted to be responsive to said at least two values of said mode indication.

7. The power unit of claim 6, wherein said temperature control portion of said hydraulic circuit includes a valve responsive to said temperature indication and providing a first flow configuration in which substantially all of said fluid is recirculated through said pump, a second flow configuration in which substantially all of said fluid is passed through said heat exchanger and said compressor motor, and a third flow configuration where substantially all of said fluid is passed through said compressor motor without being passed through said heat exchanger.

8. The power unit of claim 7, wherein the refrigeration system includes a blower for blowing air through the evaporator, the power unit further comprising a hydraulic blower motor for driving the blower in response to receiving hydraulic fluid from said pump.

9. The power unit of claim 8, wherein said pump is variable volume pressure compensated, and wherein said blower motor control portion includes a binary state valve for turning the blower either "on" or "off."

10. The power unit of claim 5, wherein the refrigeration system includes a blower for blowing air through the evaporator, the power unit further comprising a hydraulic blower motor for driving the blower in response to receiving hydraulic fluid from said pump.

11. The power unit of claim 1, wherein the refrigeration system includes a blower for blowing air through the evaporator, the power unit further comprising a hydraulic blower motor for driving the blower in response to receiving hydraulic fluid from said pump.

12. A power unit for a refrigeration system for use in a land transport vehicle having an engine for propelling the land transport vehicle and a power take off from the engine, the refrigeration system having a compressor for compressing a refrigerant, an evaporator which is cooled by the compressed refrigerant, and a blower for blowing air through the evaporator, the power unit comprising:
  a pump adapted for pumping hydraulic fluid, automatically adjusting the pressure of said hydraulic fluid in substantial compensation for changes in engine speed, and connecting to the power take off for driving said pump;
  a blower motor for driving the blower in response to receiving hydraulic fluid from said pump;
  a hydraulic circuit for conducting said hydraulic fluid from said pump to said blower motor and for conducting said hydraulic fluid from said blower motor back to said pump, said hydraulic circuit including a temperature control portion having a heat exchanger and adapted for diverting at least a portion of said hydraulic fluid through said heat exchanger in response to a temperature indication indicating the temperature of said fluid, in such manner as to provide for at least one of (a) reducing the temperature of said fluid where the temperature is too high, and (b) increasing the temperature of said fluid where the temperature is too low.

13. The power unit of claim 12, wherein said temperature control portion is adapted for diverting at least a portion of said fluid from said compressor motor in response to said temperature indication.

14. The power unit of claim 13, wherein said temperature control portion of said hydraulic circuit is adapted for recirculating said at least a portion of said hydraulic fluid through said pump in response to said temperature indication.

15. The power unit of claim 12, wherein said temperature control portion of said hydraulic circuit includes a valve responsive to said temperature indication and providing a first flow configuration in which substantially all of said fluid is recirculated through said pump, a second flow configuration in which substantially all of said fluid is passed through said heat exchanger and said compressor motor, and a third flow configuration where substantially all of said fluid is passed through said compressor motor without being passed through said heat exchanger.

16. A power unit for a refrigeration system for use in a land truck having an engine for propelling the truck and a power take off from the engine, the refrigeration system having a compressor for compressing a refrigerant, an evaporator which is cooled by the compressed refrigerant, and a blower for blowing air through the evaporator, the power unit comprising:
  a pump adapted for pumping hydraulic fluid and connecting to the power take off for driving said pump;
  a blower motor for driving the blower in response to receiving hydraulic fluid from said pump;
  a hydraulic circuit for conducting said hydraulic fluid from said pump to said blower motor and for conducting said hydraulic fluid from said blower motor back to said pump, said hydraulic circuit including a temperature control portion having a heat exchanger and adapted for diverting at least a portion of said hydraulic fluid through said heat exchanger in response to a temperature indication indicating the temperature of said fluid, in such manner as to provide for at least one of (a) reducing the temperature of said fluid where the temperature is too high, and (b) increasing the temperature of said fluid where the temperature is too low, wherein said temperature control portion of said hydraulic circuit includes a valve responsive to said temperature indication and providing a first flow configuration in which substantially all of said fluid is recirculated through said pump, a second flow configuration in which substantially all of said fluid is passed through said heat exchanger and said compressor motor, and a third flow configuration where substantially all of said fluid is passed through said compressor motor without being passed through said heat exchanger, wherein said pump is variable volume pressure compensated, and wherein said blower motor control portion includes a binary state valve for turning the blower either "on" or "off."

17. The power unit of claim 12, wherein said pump is variable volume pressure compensated, and wherein said blower motor control portion includes a binary state valve for turning the blower either "on" or "off."

18. A method for powering a refrigeration system, the refrigeration system having a compressor for compressing a refrigerant, an evaporator which is cooled by the compressed refrigerant, and a blower for blowing air through the evaporator, the method comprising:
  providing a land transport vehicle having an engine for propelling the land transport vehicle and a power take off from the engine;
  driving a hydraulic pump from the power take off and thereby pressuring hydraulic fluid;
  adjusting the pressure of said hydraulic fluid in substantial compensation for changes in engine speed by automatic operation of said pump;
  conducting the pressurized hydraulic fluid to a hydraulic motor;
  driving at least one of (a) the compressor and (b) the blower with said hydraulic motor; and
  automatically diverting at least a portion of said hydraulic fluid through a heat exchanger in response to a temperature indication indicating the temperature of said fluid, in such manner as to provide for at least one of (a) reducing the temperature of said fluid where the temperature is too high, and (b) increasing the temperature of said fluid where the temperature is too low.

19. The method of claim 18, further comprising automatically diverting at least a portion of said fluid from said hydraulic motor in response to said temperature indication.

* * * * *